United States Patent [19]

Houle

[11] Patent Number: 4,844,353

[45] Date of Patent: Jul. 4, 1989

[54] STRAW-SHREDDING KNIFE AND ROTARY KNIFE ASSEMBLY

[75] Inventor: Mario Houle, Wickham, Canada

[73] Assignee: Agrimetal Inc., Wickham, Canada

[21] Appl. No.: 164,324

[22] Filed: Mar. 4, 1988

[51] Int. Cl.$^4$ ............................................. B02C 18/18
[52] U.S. Cl. .................................. 241/101 A; 241/294
[58] Field of Search ................ 241/101 A, 293, 101.7, 241/294, 295

[56] References Cited

U.S. PATENT DOCUMENTS

| | | | |
|---|---|---|---|
| 1,477,848 | 12/1923 | Pardee | 241/295 |
| 3,151,645 | 10/1964 | Hesse | 241/295 X |
| 3,570,566 | 3/1971 | McCreery | 241/294 X |
| 4,457,058 | 7/1984 | Binder et al. | 241/294 X |
| 4,724,662 | 2/1988 | Giandenoto et al. | 241/295 X |

FOREIGN PATENT DOCUMENTS 1037839 9/1978 Canada .

OTHER PUBLICATIONS

Advertising brochure (undated) entitled WIC Bedding-Chopper.

Primary Examiner—Mark Rosenbaum
Attorney, Agent, or Firm—Robic, Robic & Associates

[57] ABSTRACT

There is disclosed a rotary knife assembly for shredding straw. It includes a non-cylindrical driving shaft and a plurality of like knifing devices mounted in succession along the shaft, each device having a pair of generally flat shredding parts. Each such part comprises a central portion having a straight edge and radial teeth projecting from the central portion, the latter further having a notch located centrally of the straight edge, notch configured to seat radially over half of the shaft. The central portion also has a boss on one face forming an arcuate shoulder around the notch. The shredding parts of each device are held in coplanar position, when the straight edges meet, by a tube of which one end closely surrounds the shoulders of the bosses, which shoulders extend along a common circle. The same end of the tube abuts one face of the parts thus holding the parts in coplanar position and preventing them from separating along their straight edges. The other end of the tube abuts one face of the shredding parts of an adjacent knifing device.

1 Claim, 4 Drawing Sheets

STRAW-SHREDDING KNIFE AND ROTARY KNIFE ASSEMBLY

BACKGROUND OF THE INVENTION

1. Field of the invention

The present invention relates to a knifing device for shredding straw or the like fibrous material. It also relates to a rotary knife assembly including a plurality of such a knifing device mounted in succession on a driving shaft.

2. Description of the prior art

A knifing device and assembly according to the invention serve in straw-shredding machines of which an example is disclosed in the Houle Canadian Pat. No. 1,037,839, issued on Sept. 5, 1978 (equivalent to U.S. Pat. No. 4,142,686 of Mar. 6, 1979). Machines of this type include a wheel-mounted base having a top wall pierced with parallel slots. Radial shredding knives spacedly mounted on a rotary shaft, located beneath the top wall, project across the slots to enter a rectangular straw-feeding rotary tube extending above the top wall and circumscribing the slots; the shaft and tube rotating about respective longitudinal axes normal to one another. The shredded straw is received into and is ejected by an elbowed conduit of which the upright curved end, secured to and beneath the top wall, surrounds the knives and slots and of which the horizontal end ejects the chopped straw from the machine to make beddings for animals in a barn or in a hen-house.

In the above mentioned Canadian and U.S. Houle patents, the radially projecting knives would appear to be unremovably secured to the shaft so that whenever one or a limited number of knives have to be sharpened or replaced, the complete shaft and knife assembly has to be removed from the machine which is a fairly complex operation considering the limited but frequent maintenance or replacement work that has to be done.

To avoid the above inconvenience, it has been suggested to removably mount each knife or shredding tooth, by bolts and nuts, on a receiving plate solid with and radially projecting from the rotary shaft so that the shredding teeth could be dismounted individually without having to remove the complete knive and shaft assembly. This idea is excellent and is an improvement over the Houle integral arrangement. However, the operation ca only be achieved by working through the very cramped space made available by the elbowed ejection conduit so that removing a tooth becomes a very different task and may also cause injuries to the hands.

Another solution that has been proposed consists in sliding the above mentioned mounting plates and teeth spacedly on the shaft; the latter having a cruciform cross-shape while the plates have a central cooperating cross-shape aperture to prevent relative rotation between the shaft and the plates. In this case, the shredding teeth are removably mounted on the plates by a limited number of elongated bolt rods each of which threads through suitable holes of both the plates and the teeth. The problem with this more adequate construction is that, as in the Houle device, the complete assembly has to be removed from the machine to reach one or a limited number of dull or broken knives. Also, once the assembly has been removed, it is usually necessary to slide a number of mounting plates and knives out of the shaft before reaching the one or ones that need be replaced or sharpened.

It is an object of the present invention to reduce appreciably the inconveniences mentioned above resulting from the necessity to remove one or a limited number of straw-shredding teeth from the mounting shaft for occasional replacement or sharpening.

SUMMARY OF THE INVENTION

The basic principle of the present invention is to do away with a knifing device that includes a one-piece teeth-receiving plate mounted on and fully around the shaft. For this purpose, the invention makes use of a basic knifing device formed of two shredding plate-like parts, each part being radially applied on and around only half of the shaft and abutting the other part along meeting edges. Appropriate easily adjustable means can then be provided on both the shredding parts and on the shaft to hold the parts safely in coplanar radial position while preventing that they fall off the shaft. Conversely, slightly loosening the releasable means will allow readily picking any selected ones of the shredding parts that need sharpening or replacement particularly without having to remove the shaft and teeth assembly from the machine.

More specifically, the invention proposes a knifing device for shredding straw and the like material, said device comprising:

a pair of essentially flat shredding parts independent of one another, each part comprising:
- a central portion having a meeting edge and having shredding teeth extending outwardly of said central portion on one side of said meeting edge;
- wherein said central portion is formed with a non-circular notch located centrally of said meeting edge;
- a boss projecting from one face of said central part, said boss forming an arcuate shoulder around said notch, said shoulder being located between said notch and said shredding teeth;
- constructed so that, in use, said shredding parts abut one another along said meeting edges and are coplanar, and said shoulders extend along a common circle.

To hold the shredding parts in coplanar position, the knifing device may further comprise an open-ended spacer tube having a predetermined diameter, this tube having one end edge-abutting one face of the shredding parts when they themselves abut one another along their meeting edges. Additionally, in order to prevent the shredding parts from separating along their meeting edges, the diameter of the tube is selected to allow its edge-abutting end to closely surround the shoulders of the bosses formed on the central portion of the knifing device.

The invention also proposes a rotary knife assembly for shredding straw and the like material, said assembly comprising:

a driving shaft having a rotation axis and a non-cylindrical outer surface symmetrical with respect to said rotation axis;

a plurality of like knifing devices mounted in succession along said shaft, each knifing device including a pair of essentially flat shredding parts with each part comprising:
- a central portion having a meeting edge and having shredding teeth extending outwardly of said central portion on one side of said meeting edge;

wherein said central portion is formed with a notch located centrally of said meeting edge; said notch being configured so that said shredding part snugly seats over half of said outer surface of said driving shaft and projects radially therefrom;

a boss projecting from one face of said central part, said boss forming an arcuate shoulder around said notch, said shoulder being located between said notch and said shredding teeth;

wherein said shredding parts of each of said knifing devices abut one another along said meeting edges and said shoulders extend along a common circle;

wherein each of said knifing devices further comprises an open-ended spacer tube, coaxial with said shaft, of which one end closely surrounds said shoulders of said bosses and edgedly abuts said parts on the corresponding face thereof whereby to hold said parts in coplanar radial position on said shaft and prevent them from separating along said meeting edges, the other end of said spacer tube abutting one face of the flat shredding parts of an adjacent knifing device, and means at the ends of said shaft adjustably clamping said successive knifing devices against one another.

A description now follows of a preferred embodiment of the invention, having reference to the appended drawings.

DESCRIPTION OF THE PREFERRED EMBODIMENT

Figure 1:
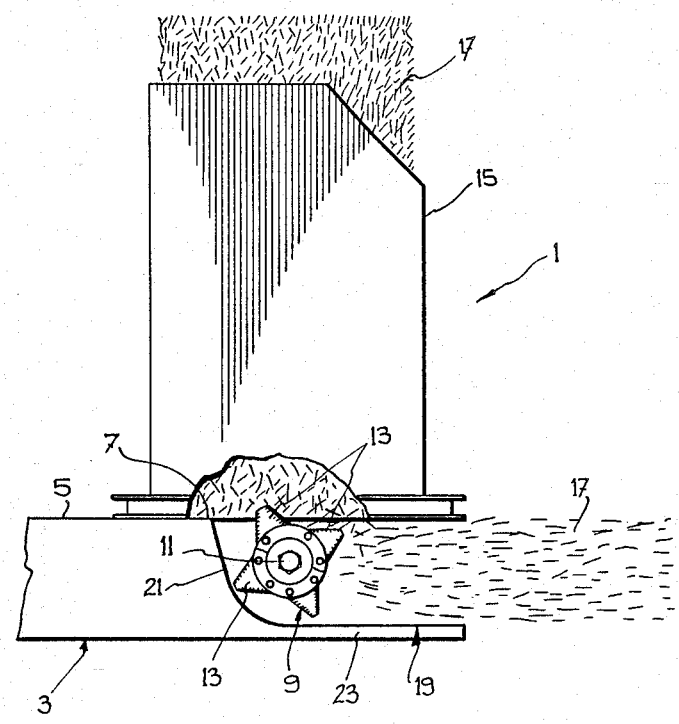
FIG. 1 is an elevation view, partly in cross-section, of part of a straw-shredding machine on which a knifing device and a rotary shaft assembly, made according to the invention, are mounted.
Figure 2:
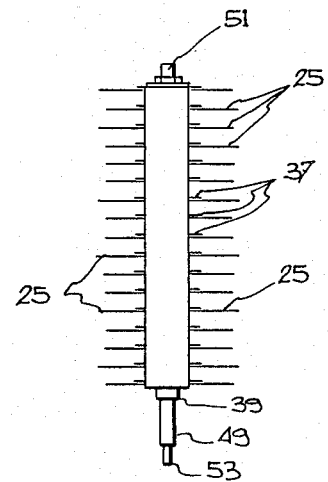
FIG. 2 is a plan view of a knife assembly according to the invention.

As mentioned previously and as schematically illustrated in FIG. 1, the invention is for use on a straw-shredding machine 1 having a wheel-mounted base 3 including a top wall 5 pierced with a series of aligned parallel slots 7. Knifing devices 9, spacedly mounted on a non-cylindrical shaft 11 located beneath the top wall 5, have shredding teeth 13 that project across the slots 7 to enter a rectangular straw-feeding rotary tube 15 extending above the top wall 5 and circumscribing the slots 7. The shaft 11 and tube 15 rotate about respective longitudinal axes that intersect at right angles. The shredded straw 17 is received into and is ejected by an elbowed conduit 19 of which the upright curved end 21, secured to and beneath the top wall 5, surrounds the knifing devices 9 and the slots 7. The horizontal end 23 of the conduit 19 ejects the chopped straw 17 from the machine 1. As will be noted, the working space available within the conduit 19 is quite cramped so that, in prior art machines, removal of selected knifing devices 9 has been quite difficult, as aforesaid.

In some cases, it is necessary to remove the entire knife and shaft assembly.

Figure 3:
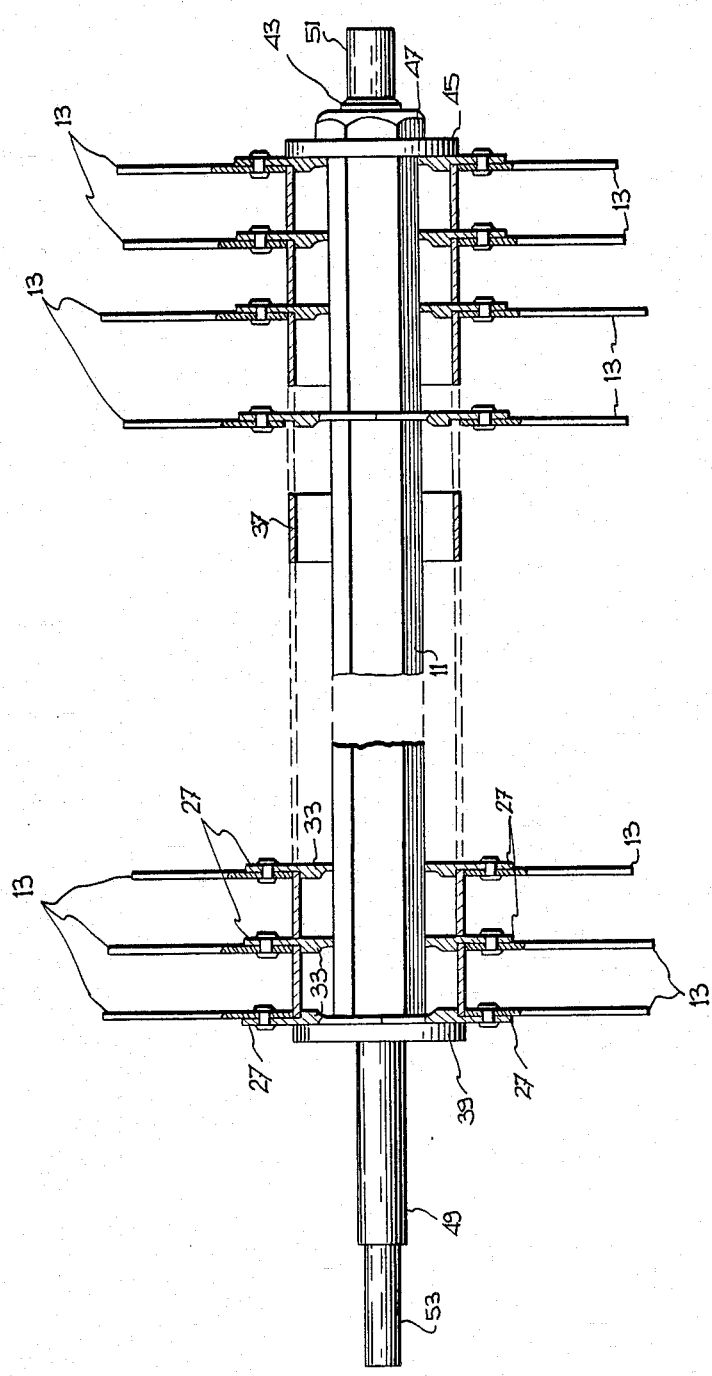
FIG. 3 is a view similar to that of FIG. 2 but on a larger scale.
Figure 4:
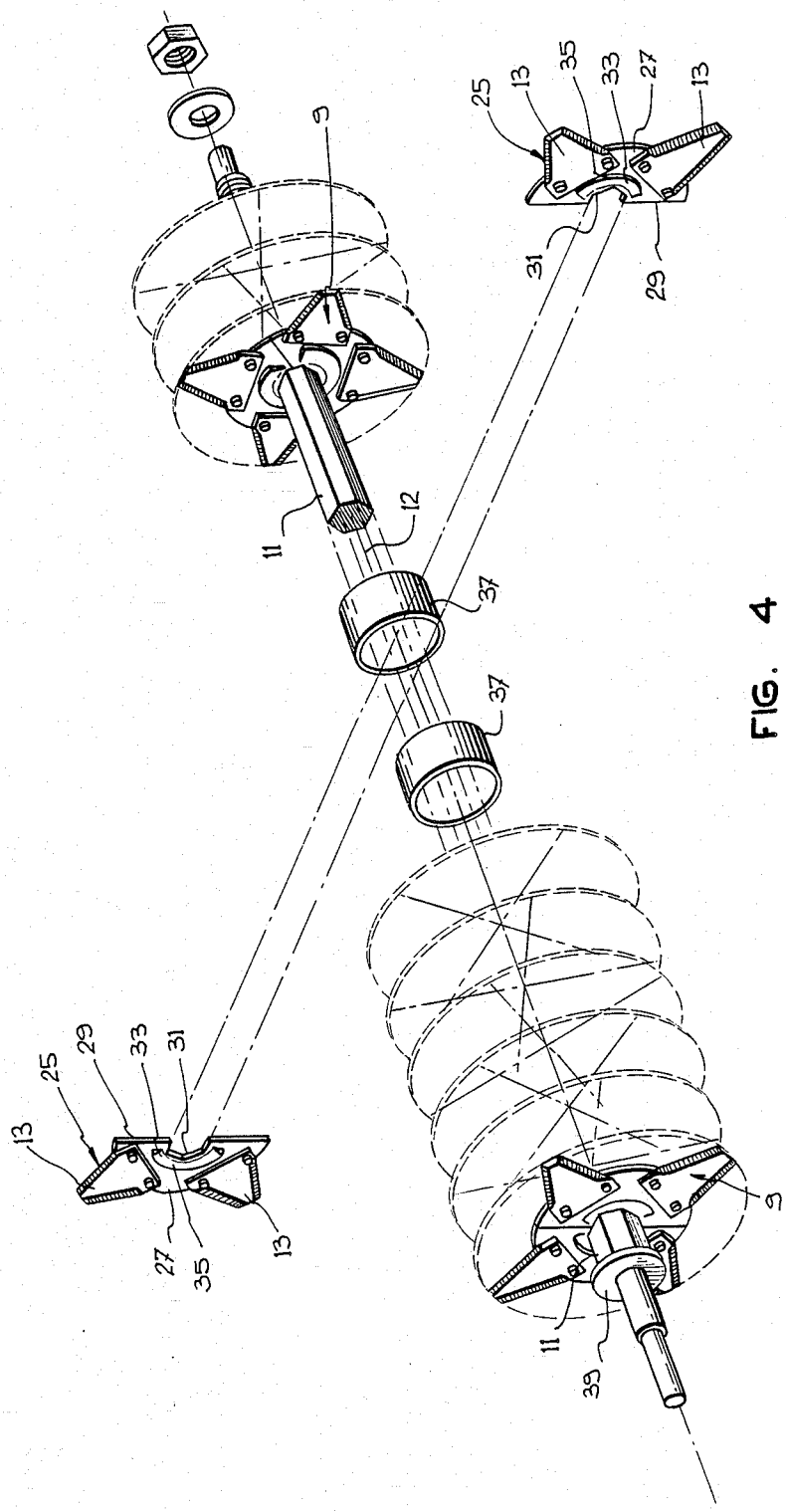
FIG. 4 is an exploded view, in perspective, of the assembly of FIG. 3.

Referring now more particularly to FIGS. 3 and 4, there is shown the aforementioned driving shaft 11 which has a rotation axis 12 and a non-cylindrical outer surface which is symmetrical with respect to the axis 12. Preferably, the shaft 11 is hexagonal. Mounted thereon, in succession, is a plurality of like knifing devices 9 each of which includes a pair of generally flat and alike shredding parts 25 cooperating with one another but unconnected.

Each shredding part 25 comprises a central portion 27 having a preferably straight meeting edge 29 and having shredding teeth 13 extending radially outwardly on one side of the meeting edge 29. The central portion 27 is formed with a notch 31 located centrally of the meeting edge 29 and configured so that it snugly edgedly seats over half of the outer surface of the shaft 11 and projects radially from it. Where the shaft 11 is hexagonal, the notch 31 of course defines half a hexagon. This configuration ensures that the shredding parts 25 and the shaft 11 rotate in unison. Finally, the central portion 27 is pressed out or stamped from one face to provide a crescent-shaped boss 33 projecting from the other face and forming an arcuate shoulder 35 around the notch 31 between the latter and the shredding teeth 13. When assembled, the shredding parts 25 edgedly abut one another along the meeting edges 29 and the shoulders 35 extend along a common circle of which the center is located on the shaft axis 12.

The outer periphery of the central portion 27 is shown to be preferably semi-circular but it may have any other suitable configuration, rectangular for instance. Likewise, the shredding teeth are shown to be triangular with two bevelled cutting sides but it is obvious that other forms may be considered.

While physically unconnected together and to the shaft 11, the shredding parts 25 are still held in edge-abutting relation along their meeting edges 29 so that they do not fall off the shaft 11. They are also held in operative coplanar and radial position with respect to the shaft. For this purpose, each knifing device 9 may further comprise an open-ended spacer tube 37, coaxial with the shaft 11, of which one end closely surrounds the shoulders 35 of the bosses 33 of both parts 25 and edgedly abuts the corresponding face. With the bosses 33 entering into the spacer tube 37, the latter prevents the shredding parts 25 from falling off the shaft 11 since they cannot separate along their meeting edges 29. At the same time, the other end of the same spacer tube 37 abuts one face of the flat shredding parts of an adjacent knifing device 9. With this arrangement, each pair of edge-abutting shredding parts is acted upon, on its opposed faces, by a pair of spacer tubes 37 and can thus be held in coplanar radial position.

Finally, means are provided at the ends of the shaft 11 for adjustably clamping the successive knifing devices 9 against one another. As best illustrated in FIG. 3, such means may take the form of a first stop member 39 made solid with the shaft 11 by screws (not shown) or welding. The member 39 extends radially past the outer surface of the shaft 11 so that an inverted knifing device 9 may be applied against it, as in FIG. 3, or against a spacer tube 37, as in FIG. 4. In order that an adjustable pressure may be applied against the successive knifing devices 9 in the direction of the first stop member 39 to hold them in proper working position, the other end of the shaft 11 is provided with a threaded stud 43 (FIG. 3) coaxially extending from the shaft 11 and over which loosely fits an annular second stop member 45, bearing against the adjacent knifing device 9 and pressed against it by a nut 47. To be workable, the total length of all the knifing devices 9, which include the spacer tubes 37, must of course exceed that of the shaft from the first stop member 39 up to the threaded stud 43.

To release a selected set of shredding parts 25, the nut 47 is moved away slightly from the second stop member 45 and the relevant spacer ring 37 moved away from the shoulders 35 of the shredding parts 25 of which the shredding teeth are to be sharpened or replaced.

Projecting from the first stop member 39 and from the shaft 11 are journals 49, 51, respectively intended for seating in suitable bearings (not shown), journals 49, 51, being coaxial with the shaft 11. Journal 49 further extends into a drive shaft 53 connected to the drive motor (not shown) of the machine.

Figure 5:
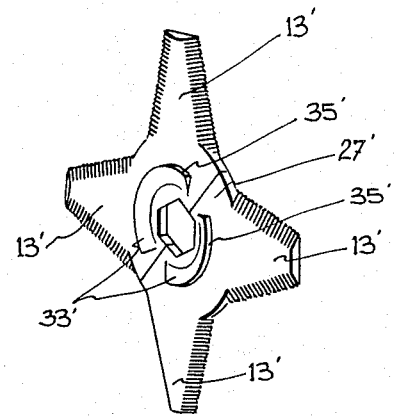
FIG. 5 is a perspective view of a pair of shredding parts edge-abutting one another, according to a variant.

In FIGS. 3 and 4, the shredding teeth 13 are shown to be secured to the central portions 27 by rivets. Alternatively, and as shown in FIG. 5, the teeth 13' and the central portions 27' may form a unitary member.

I claim:

1. A machine for shredding fibrous material comprising:
    (a) a base having a top wall formed with parallel through slots for the passage of material to be shredded;
    (b) a feeding member mounted above said base around said slots for feeding fibrous material to be shredded through said slots;
    (c) a conduit for ejecting shredded fibrous material, said conduit having an inlet end mounted beneath said top wall and surrounding said slots for receiving shredded material;
    (d) a driving shaft rotatably mounted within and across said ejection conduit at said inlet end beneath said slots;
    (e) a plurality of like knifing devices mounted in succession along said shaft, each device including a pair of essentially flat like shredding parts each passing through one of said slots and projecting into said feeding member for shredding fibrous material therein, each shredding part comprising:
    (e1) a central portion having a radial meeting edge and having shredding teeth extending outwardly of said central portion and on one side of said meeting edge;
    (e2) a boss projecting from one face of said central portion, said boss forming a shoulder located between said boss and said shredding teeth;
    (f) wherein said shredding parts of each pair of knifing devices abut one another along said meeting edges and said shoulders extend along a common circumference;
    (g) means mounting said knifing devices on said shaft for preventing relative rotation with said shaft and for allowing sliding displacement along said shaft;
    (h) wherein each of said knifing devices further comprises an open-ended spacer tube, coaxial with and circumscribing said shaft, of which one end snugly fits over said shoulders of said bosses and edgedly abuts said faces from which said bosses project, whereby to hold said shredding parts in coplanar radial position on said shaft and prevent them from separating along said meeting edges, and wherein the other end of said spacer tubes abuts one face of the flat shredding parts of an adjacent knifing device;
    (i) a first stop member solid with said shaft at one end thereof and projecting radially of said shaft;
    (j) a second stop member at the other end of said shaft; said knifing devices being positioned between said first and second stop members;
    (k) an outwardly threaded stud solid with and coaxially extending from and having a smaller diameter than said shaft, said second stop member being freely mounted over said stud and extending radially beyond the outer surface of said shaft, and
    (l) a nut screwed on said threaded stud and pressingly applied against said second stop member thereby pushing said knifing devices against said first stop member and clamping said devices together.

* * * * *